UNITED STATES PATENT OFFICE.

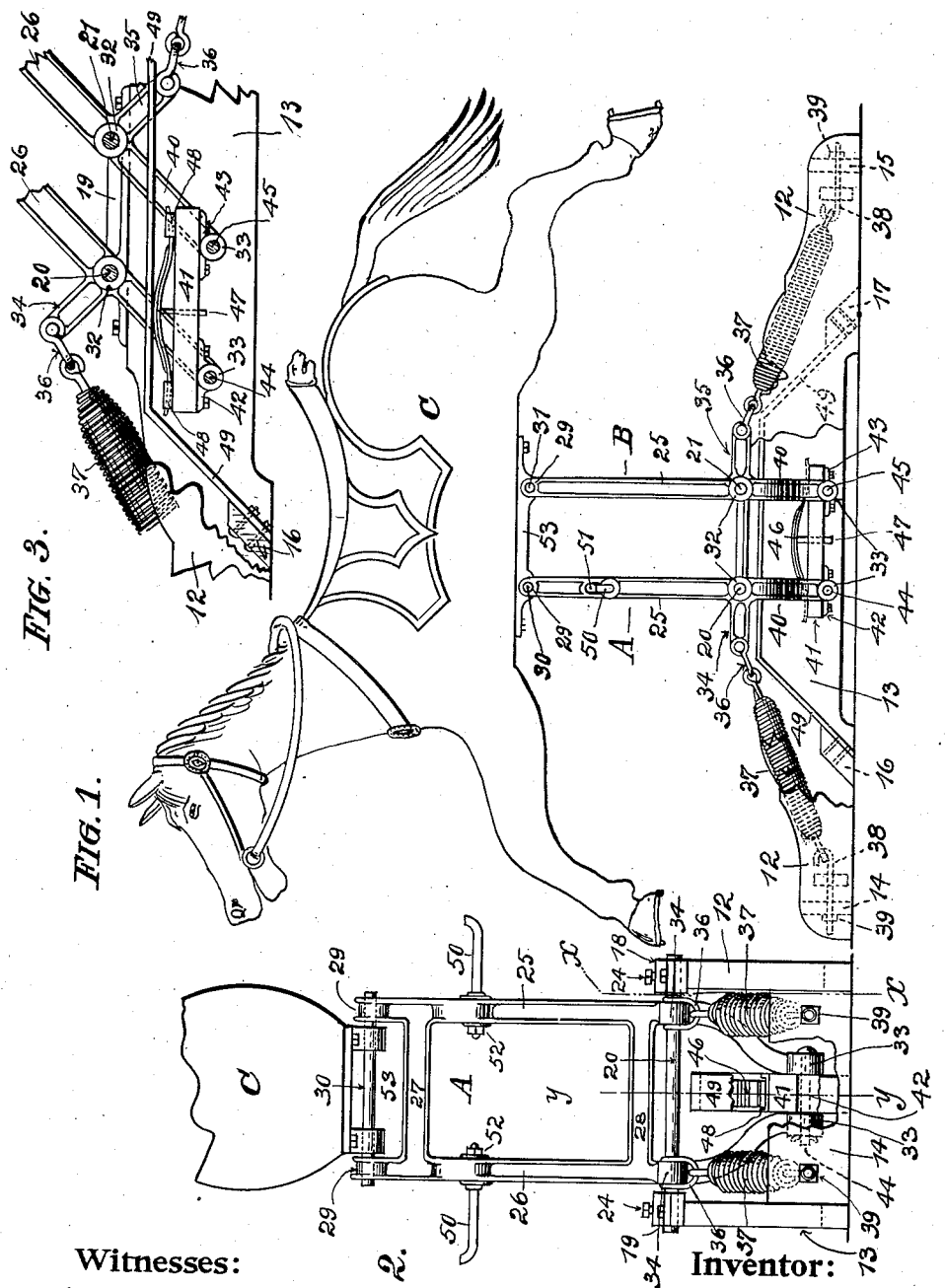

CARL SCHULZE, OF CHICAGO, ILLINOIS.

EXERCISING-MACHINE.

974,194.  Specification of Letters Patent.  Patented Nov. 1, 1910.

Application filed December 29, 1909. Serial No. 535,489.

*To all whom it may concern:*

Be it known that I, CARL SCHULZE, a subject of the Empire of Germany, and resident of Chicago, in Cook county, State of Illinois, have invented certain new and useful Improvements in Exercising-Machines; and I do hereby declare that the following description of my invention, taken in connection with the accompanying sheet of drawings, forms a full, clear, and exact specification, which will enable others skilled in the art to which it appertains to make and use the same.

This invention has general reference to improvements in exercising machines; and it consists, essentially, in the novel and peculiar combination of parts and details of construction, as hereinafter first fully set forth and described and then pointed out in the claim.

In the drawings already referred to, which serve to illustrate this invention more fully, Figure 1 is a side-elevation, illustrating the preferred embodiment of my invention, part of one of the two side-members of the platform being broken away to disclose the mechanism located between them. Fig. 2 is an end-elevation. Fig. 3 is an elevation, partly in section of a fragment of the operating mechanism, the figure being drawn on line *y y* of Fig. 2.

Like parts are indicated by corresponding symbols and characters of reference in all the various figures.

The object of this invention is the production of an efficient and serviceable machine adapted for exercising, recreation, and sporting purposes. To attain these ends, I construct this machine substantially as follows:

12 and 13 designate the two side-members of a platform; they are, preferably, shaped boards set on edge and spaced a sufficient distance apart to lend stability to the device. These two side-members are connected together near their ends by cross-ties 14, 15, and at a distance from these cross-ties by further transverse-members 16, 17. Upon the upper edges of these side-members 12, 13, there are located bearings 18, 19, within which are placed transverse shafts 20, 21, each of said bearings 18, 19, having two bosses wherein said shafts 20, 21, are secured by fastening-screws 24, as shown in Fig. 2.

A and B designate two frames which are constructed substantially alike, preferably in metal castings, and each comprising two side-members 25, 26, connected together by upper cross-bar 27 and lower cross-bar 28. These side-members 25 26 have at their upper ends bosses 29, wherein are located shafts 30, 31, properly secured in said bosses. Near the lower ends of these side-members 25 26, there are formed further bosses 32, which receive the shafts 20, 21, respectively; and at the lower end of these side-members 25 26 there are still further bosses 33. From the bosses 32 there project arms 34, 35, at right angles, or approximately at right angles, to the side-members 25, 26. To the outer ends of these arms there are pivoted, yokes, 36, of which there are four, and to these yokes 36 there are connected spiral springs 37, said springs being hooked to eyebolts 38, having adjusting nuts 39, by which the springs may be slightly tensioned, the eye-bolts 38 passing through the cross-ties 14, 15, and the nuts 39 being on the outside thereof.

The lower ends of the side-members 25 26 are inwardly bent at 40, to receive between them a block 41, to the lower surface of which there are secured two bearings 42, 43, which receive bolts 44, 45, by means of which the block 41 is pivoted to the lower ends of the side-members 25 26.

Upon the upper surface of the block 41 there are located curved springs 46, consisting of several leaves similar to a carriage spring, said spring being retained upon said block by a bolt 47, and guided thereupon by shoes 48, as illustrated in Fig. 3.

49 designates a bent bar the ends of which are bolted to the transverse members 16, 17. It is located midway between the side-members 12 13, its horizontally-disposed portion overlying the block 41, as clearly shown in Figs. 1 and 3.

C designates a seat upon which the person desiring to take exercise will be mounted. It may be of any desired configuration or design, such as a chair, an animal, &c., which the rider is assumed to straddle, his lower limbs resting upon bars or stirrups 50, projecting sidewise from the forward members 25 of the frame A, and adjustably retained in slots 51, by nuts 52.

To the lower surface of the seat C there are secured bearings 53, within which the seat C is carried by shafts 30, 31.

Having thus described the main features of this device, I shall now proceed to explain its operation: Assume the person desirous of taking muscular exercise mounted upon the seat C and his lower limbs resting upon the stirrups 50: by giving his body a forward and backward swinging motion, he will cause the seat C to partake of a like movement, the seat swinging with the frames A and B, which latter oscillate upon the shafts 20, 21. When these frames A, B, with their arms 34, 35, oscillate, the spiral springs 37 will be slightly tensioned to prevent a too rapid or violent rocking motion which, if carried to the limit of the forward and backward movement, will cause the curved blade-spring 46 upon the block 41 to strike the under side of the horizontal portion of the bar 49, and absorb the shock, and also rebound or reverse the movement of the rocking parts.

This machine when properly used brings into action, and develops the entire muscular structure of the human body, and it is, therefore, a healthful and recreative exercise.

While I have heretofore described in detail the preferred embodiment of my invention, I desire it understood that many of the details may be varied without departing from the scope of this invention.

Having thus fully described this invention, I claim as new and desire to secure to me by Letters Patent of the United States—

An exercising machine, comprising, in combination, a platform, a seat above said platform, two frame-members spaced apart and connected to said platform by pivotal means, shafts upon which said frame-members oscillate, each of said frame-members comprising two connected bars, arms on said frame-members and projecting in opposing directions therefrom, spiral springs connected to the outer end of said arms, said springs being in angular relation to said arms, a tensioning device for each of said springs to which the other ends of said springs are secured, said tensioning devices being located near the outer ends of said platform, a yoke at the lower ends of said frame-members and pivotally connecting the same, one to the other, a curved spring on the upper surface of said yoke, and a bent bar located above said latter spring and below said shafts, said bent bar being secured at its ends in said platform.

In testimony that I claim the foregoing as my invention I have hereunto set my hand in the presence of two subscribing witnesses.

CARL SCHULZE.

Attest:
MICHAEL J. STARK,
A. G. PETERSON.